R. F. FRENCH.
DUST CAP FOR TIRE VALVES.
APPLICATION FILED JULY 8, 1918.
1,285,670.
Patented Nov. 26, 1918.
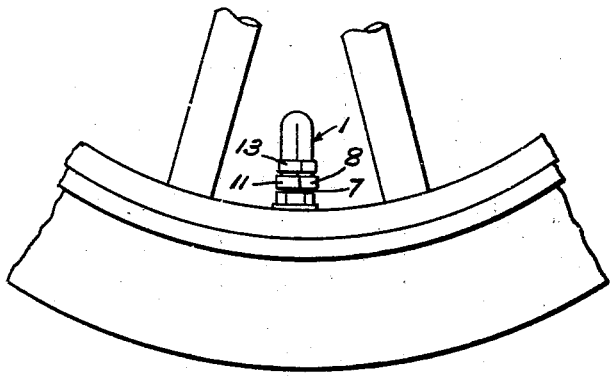
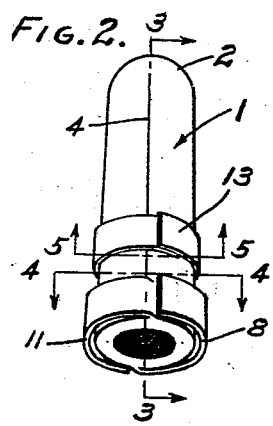
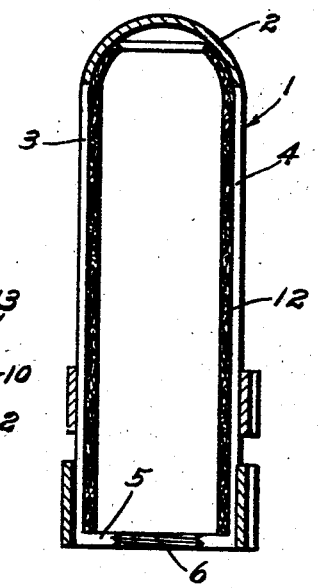
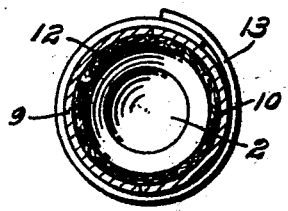
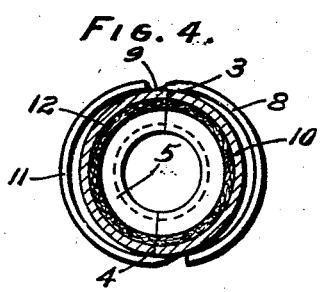
INVENTOR
ROYAL F. FRENCH
BY Hazard & Miller
ATT'YS.

UNITED STATES PATENT OFFICE.

ROYAL F. FRENCH, OF LOS ANGELES, CALIFORNIA.

DUST-CAP FOR TIRE-VALVES.

1,285,670.

Specification of Letters Patent. Patented Nov. 26, 1918.

Application filed July 8, 1918. Serial No. 243,927.

*To all whom it may concern:*

Be it known that I, ROYAL F. FRENCH, a citizen of the United States, residing at Los Angeles, in the county of Los Angeles and State of California, have invented new and useful Improvements in Dust-Caps for Tire-Valves, of which the following is a specification.

My invention relates to dust caps and consists of the novel features herein shown, described and claimed.

Figure 1 is a fragmentary side elevation of a wheel having a pneumatic tire and showing a dust cap embodying the principles of my invention in position for use.

Fig. 2 is a perspective of the dust cap removed from the tire valve.

Fig. 3 is an enlarged vertical sectional detail on the line 3—3 of Fig. 2.

Fig. 4 is a horizontal cross-section on the line 4—4 of Fig. 2 and looking downwardly.

Fig. 5 is an enlarged horizontal cross-section on the line 5—5 of Fig. 2 and looking upwardly.

The main body 1 is stamped from thin resilient sheet metal and is circular in cross-section, has a rounded upper end 2, and slits 3 and 4 extending from the lower end to near the upper end, the metal being pressed or formed so that the edges or faces forming the slits are normally close together. A flange 5 is turned inwardly at the lower end of the body, said slits 3 and 4 extending through the flange. A screw-threaded opening 6 is formed by the flange, said opening being tapped to fit the external threads 7 upon the tire valve. A handle 8 is secured to the outer face of the part 9 near the slit 3 and extends substantially half way around the body a slight distance from the part 10, and a similar handle 11 is secured to the outer face of the part 10 near the slit 4 and extends substantially half way around the body a slight distance from the part 9, so that when the handles 8 and 11 are grasped between the thumb and forefinger and pressed the parts 9 and 10 will be forced apart to release the threads 6 from the tire valve threads 7.

A tubular felt lining 12 is inserted into the body 1 to cover the slits 3 and 4 and exclude dust.

A spring clamp 13 is formed of a strip of resilient material such as hard brass or a piece of clock spring bent to a circle slightly smaller than the periphery of the body 1, and the clamp is pressed downwardly around the body, the tension of the clamp being exerted to hold the parts 9 and 10 together and close the slits 3 and 4 and hold the threads 6 in engagement with the tire valve threads 7.

When it is desired to remove the dust cap the handles 8 and 11 are pressed together sufficiently to overcome the tension of the spring clamp 13 and when it is desired to place the dust cap in position the handles 8 and 11 are again operated to expand the spring clamp 13 and allow the threads 6 to snap over the threads 7 upon the tire valve.

Various changes may be made without departing from the spirit of my invention as claimed.

I claim:

1. A dust cap comprising a cylindrical body of thin metal closed at one end and having an inturned flange at the other end and longitudinal slits; the inturned flange having a screw-threaded opening to fit the external threads of a tire valve; and handles extending from the parts formed by the slits; said handles being crossed so that pressing the handles together will spread the parts apart.

2. A dust cap comprising a cylindrical body of thin metal closed at one end and having an inturned flange at the other end and longitudinal slits; the inturned flange having a screw-threaded opening to fit the external threads of a tire valve; handles extending from the parts formed by the slits; said handles being crossed so that pressing the handles together will spread the parts apart; and a fabric lining in the hollow of the cylinder.

3. A dust cap comprising a cylindrical body of thin metal closed at one end and having an inturned flange at the other end and longitudinal slits; the inturned flange having a screw-threaded opening to fit the external threads of a tire valve; handles extending from the parts formed by the slits; said handles being crossed so that pressing the handles together will spread the parts apart; and a spring clamp embracing the parts formed by the slits; the tension of the clamp being exerted to press the parts yieldingly together.

In testimony whereof I have signed my name to this specification.

ROYAL F. FRENCH.